United States Patent
Nilen et al.

(10) Patent No.: US 9,382,763 B2
(45) Date of Patent: Jul. 5, 2016

(54) SUPERHARD CONSTRUCTION

(75) Inventors: Roger William Nigel Nilen, Springs (ZA); Robert Fries, Springs (ZA)

(73) Assignee: ELEMENT SIX ABRASIVES S.A., Luxembourg (LU)

( * ) Notice: Subject to any disclaimer, the term of this patent is extended or adjusted under 35 U.S.C. 154(b) by 94 days.

(21) Appl. No.: 13/811,184

(22) PCT Filed: Jul. 20, 2011

(86) PCT No.: PCT/EP2011/062481
§ 371 (c)(1),
(2), (4) Date: Jun. 10, 2013

(87) PCT Pub. No.: WO2012/010646
PCT Pub. Date: Jan. 26, 2012

(65) Prior Publication Data
US 2013/0263522 A1    Oct. 10, 2013

Related U.S. Application Data

(60) Provisional application No. 61/366,423, filed on Jul. 21, 2010.

(30) Foreign Application Priority Data

Jul. 21, 2010  (GB) .................................. 1012240.6

(51) Int. Cl.
*E21B 10/55*     (2006.01)
*E21B 10/573*    (2006.01)
(Continued)

(52) U.S. Cl.
CPC ............... *E21B 10/5735* (2013.01); *B22F 7/06* (2013.01); *C22C 26/00* (2013.01); *B22F 2998/00* (2013.01); *B23B 2226/315* (2013.01); *C22C 2204/00* (2013.01)

(58) Field of Classification Search
CPC ......... E21B 10/56; E21B 10/00; E21B 10/46; E21B 10/55; E21B 10/54; B24D 3/00; B24D 3/02; B24D 3/06; B24D 3/08; B24D 3/28; B24D 18/00; C09K 3/14; C09K 3/1409; C09K 3/1436; C09K 3/1427; C09K 3/1418; B23B 27/14; B23B 27/20
See application file for complete search history.

(56) References Cited

U.S. PATENT DOCUMENTS 5,151,107 A *  9/1992  Cho ......................... B01J 3/062
                                              51/293
6,068,913 A    5/2000  Cho et al.
(Continued)

FOREIGN PATENT DOCUMENTS

EP   0604211 A1    6/1994
WO   2010046860 A1 4/2010

OTHER PUBLICATIONS

International Search Report for PCT/EP2011/062481 dated Nov. 27, 2012.

*Primary Examiner* — Pegah Parvini
*Assistant Examiner* — Alexandra M Moore
(74) *Attorney, Agent, or Firm* — Bryan Cave LLP (57) ABSTRACT

A method of making a superhard construction includes providing a polycrystalline superhard (PCS) structure comprising bonded grains of a superhard material, providing an aggregated mass comprising grains of the superhard material, and providing a substrate having a recess configured for accommodating the PCS structure. The PCS structure is placed into the recess with the aggregated mass of superhard grains positioned adjacent the PCS structure to form an unjoined assembly. Pressure and heat are then applied to the unjoined assembly to join the aggregated mass to the PCS structure and form the superhard construction.

16 Claims, 6 Drawing Sheets

(51) Int. Cl.
 *B22F 7/06* (2006.01)
 *C22C 26/00* (2006.01)

(56) References Cited

U.S. PATENT DOCUMENTS

| | | | |
|---|---|---|---|
| 6,258,139 B1 | 7/2001 | Jensen | |
| 2005/0103533 A1* | 5/2005 | Sherwood, Jr. | E21B 10/55 175/432 |
| 2005/0263328 A1* | 12/2005 | Middlemiss | 175/434 |
| 2006/0021802 A1* | 2/2006 | Skeem | E21B 10/5735 175/432 |
| 2006/0278441 A1* | 12/2006 | Cooley | E21B 10/5735 175/374 |
| 2008/0085407 A1* | 4/2008 | Cooley et al. | 428/336 |
| 2009/0022952 A1 | 1/2009 | Keshavan | |
| 2011/0176879 A1* | 7/2011 | Jonker | B22F 7/062 408/144 |

* cited by examiner

SUPERHARD CONSTRUCTION

FIELD

This disclosure relates to superhard constructions, particularly but not exclusively to constructions comprising polycrystalline diamond (PCD) structures and for use as cutter inserts for drill bits for boring into the earth.

BACKGROUND

Polycrystalline superhard materials, such as polycrystalline diamond (PCD) and polycrystalline cubic boron nitride (PCBN) may be used in a wide variety of tools for cutting, machining, drilling or degrading hard or abrasive materials such as rock, metal, ceramics, composites and wood-containing materials. For example, tool inserts comprising PCD material are widely used in drill bits for boring into the earth to extract oil or gas. The working life of superhard tool inserts may be limited by fracture of the superhard material, including by spalling and chipping, or by wear of the tool insert.

U.S. Pat. No. 6,258,139 discloses a polycrystalline diamond compact (PDC), in which a carbide substrate is provided having a number of recesses, within which a number of diamond core protrusions are sintered in place. The diamond core protrusions and the diamond surface region may be portions of the same diamond material or not of the same diamond material. The PDC is preferably fabricated by placing a carbide substrate, having a provided cavity, in a can assembly. Diamond crystals or grains are placed into the cavity in the carbide substrate. Additional carbide is placed in the cavity over the diamond. Next, additional diamond is placed over the finished substrate with the enclosed diamond core. High pressure and high temperature are applied to sinter of the carbide diamond regions into the PDC structure.

There is a need for a superhard construction having extended working life in high wear or high impact application, such as boring into rock.

SUMMARY

Viewed from one aspect there is provided a method of making a superhard construction, the method including providing a polycrystalline superhard (PCS) structure comprising bonded grains of a superhard material, providing an aggregated mass comprising grains of the superhard material, providing a substrate having a recess configured for accommodating the PCS structure; placing the PCS structure into the recess with the aggregated mass of superhard grains positioned adjacent the PCS structure, or abutting the superhard structure to form an unjoined assembly; applying pressure and heat to the unjoined assembly to join the aggregated mass to the PCS structure and form the superhard construction.

In one embodiment, the method includes providing a source of catalyst material for the superhard grains proximate an interface between the PCS structure and the aggregated mass. In one embodiment, the catalyst material may comprise cobalt, iron, nickel or manganese, or an alloy comprising any of these.

In one embodiment, the recess may be configured to accommodate the PCS structure and at least one additional structure. In some embodiments, the additional structure may comprise a PCS structure or a cemented carbide structure, or the additional structure may consist of a PCS structure or a cemented carbide structure. In one embodiment, the method may include placing at least one additional PCS structure in the recess in contact with the PCS structure and sintering the PCS structure and the additional PCS structure to each other.

In one embodiment, the method includes sintering the aggregated mass directly to the PCS structure. In one embodiment, the method includes applying sufficient pressure and heat to the unjoined assembly for a sufficient period for superhard grains in the PCS structure to bond directly to superhard grains of the aggregated mass.

In some embodiments, the method may include bonding the PCS structure or the aggregated mass, or both the PCS structure and the aggregate mass to the substrate.

In some embodiments, the substrate, the PCS structure or the aggregated mass, or a combination of these may include catalyst material for the superhard grains. In some embodiments, at least a part of the PCS structure or the aggregated mass may be substantially free of catalyst material for the superhard grains, or the whole of the PCS structure or the aggregated mass may be substantially free of catalyst material for the superhard grains.

In one embodiment, the aggregated mass may comprise bonded superhard grains and in another embodiment, the aggregated mass may comprise substantially unbonded superhard grains. In one embodiment, the aggregated mass may comprise superhard grains held together by a binder material. In one embodiment, the aggregated mass may comprise a PCS structure or consist of a PCS structure.

In some embodiments, the PCS structure may comprise PCD material or consist of PCD material, and in one embodiment, the superhard grains may comprise diamond grains. In one embodiment, the aggregated mass may comprise PCD material. In some embodiments, the PCS structure or the aggregated mass, or both, may be thermally stable PCD.

In one embodiment, the substrate may comprise cemented tungsten carbide material, and in one embodiment, the substrate may contain catalyst material for diamond.

In one embodiment, the method includes providing a first polycrystalline diamond (PCD) structure, providing a second PCD structure, providing a cemented carbide substrate having a recess configured for accommodating the second PCD structure; placing the second PCD structure into the recess with the first PCD structure positioned adjacent the second PCD structure to form an unjoined assembly; applying a pressure of at least about 5.5 GPa and heat to generate a temperature of at least about 1,250 degrees centigrade to the unjoined assembly to join the first PCD structure to the second PCD structure to produce a PCD construction.

In one embodiment, the recess may have a depth of at least about 1 mm, or at least about 2 mm, and in one embodiment, the depth of the recess is selected such that a surface of the second PCD structure may be substantially flush with an end surface of the substrate when the second PCD structure is placed in the recess. In one embodiment, the first PCD structure may have the general form of a disc or wafer.

In one embodiment, the PCD construction may be for a drill bit for boring into or degrading rock.

DRAWINGS

Non-limiting embodiments will now be described with reference to the accompanying drawings, of which

The same reference numbers refer to the same respective features in all drawings.

DETAILED DESCRIPTION OF EMBODIMENTS

As used herein, a "superhard material" is a material having a Vickers hardness of at least about 28 GPa. Diamond and cubic boron nitride (cBN) material are examples of superhard materials.

Figure 1:
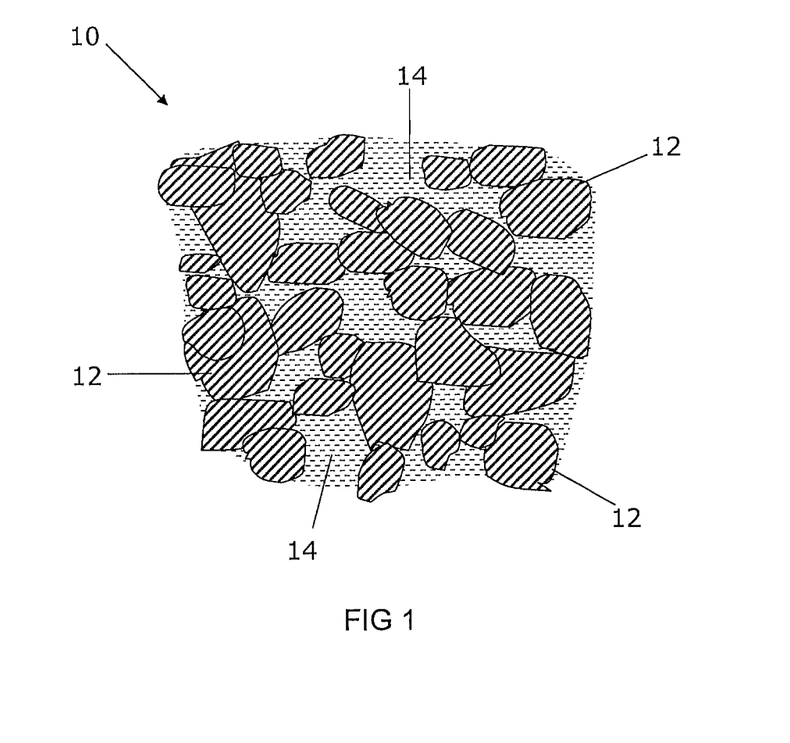
FIG. 1 shows a schematic drawing of the microstructure of an embodiment of a PCS material.

With reference to FIG. 1, a "polycrystalline superhard" (PCS) material 10 comprises a mass of grains 12 of a superhard material and interstices 14 between the superhard grains 12, which may be at least partly filled with filler or binder material, the content of the superhard grains 12 being at least about 50 percent of the material by volume. The grains 12 may comprise diamond or cubic boron nitride (cBN). As used herein, a "superhard construction" means a construction comprising polycrystalline superhard material.

As used herein, polycrystalline diamond (PCD) is a type of polycrystalline superhard material (PCS) material comprising a mass of diamond grains, a substantial portion of which are directly inter-bonded with each other and in which the content of diamond is at least about 80 volume percent of the material. In one embodiment of PCD material, interstices between the diamond grains may be at least partly filled with a binder material comprising a catalyst for diamond. As used herein, "interstices" or "interstitial regions" are regions between the diamond grains of PCD material. In embodiments of PCD material, interstices or interstitial regions may be substantially or partially filled with a material other than diamond, or they may be substantially empty. Embodiments of PCD material may comprise at least a region from which catalyst material has been removed from the interstices, leaving interstitial voids between the diamond grains.

As used herein, PCBN (polycrystalline cubic boron nitride) material refers to a type of superhard material comprising grains of cubic boron nitride (cBN) dispersed within a matrix comprising metal or ceramic. PCBN is an example of a superhard material.

A "catalyst material" for a superhard material is capable of promoting the growth or sintering of the superhard material.

Figure 2A:
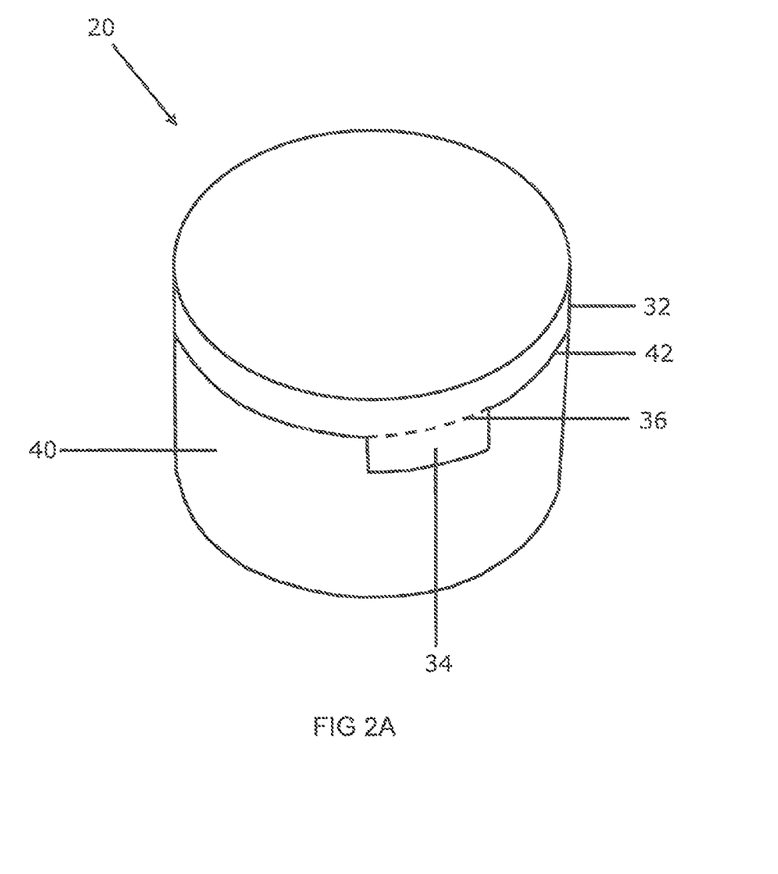
FIG. 2A shows schematic perspective view of an embodiment of a superhard construction, for a drill bit for boring into rock.

With reference to FIG. 2A, an embodiment of a superhard construction 20 comprises a first PCD structure 34 located within a recess formed into a proximate end 42 of a generally cylindrical cobalt-cemented tungsten carbide substrate, and bonded to the substrate 40. The recess is configured to accommodate the first PCD structure 34. A second PCD structure 32 may be sintered to a side or end of the first PCD structure 34 at an interface 36 and bonded to the substrate 40 at the proximate end 42. The cobalt within the substrate 40 may function as a catalyst material for sintering diamond. The superhard construction 20 may be suitable for use as a cutter insert for a drill bit for boring into the earth.

Figure 2B:
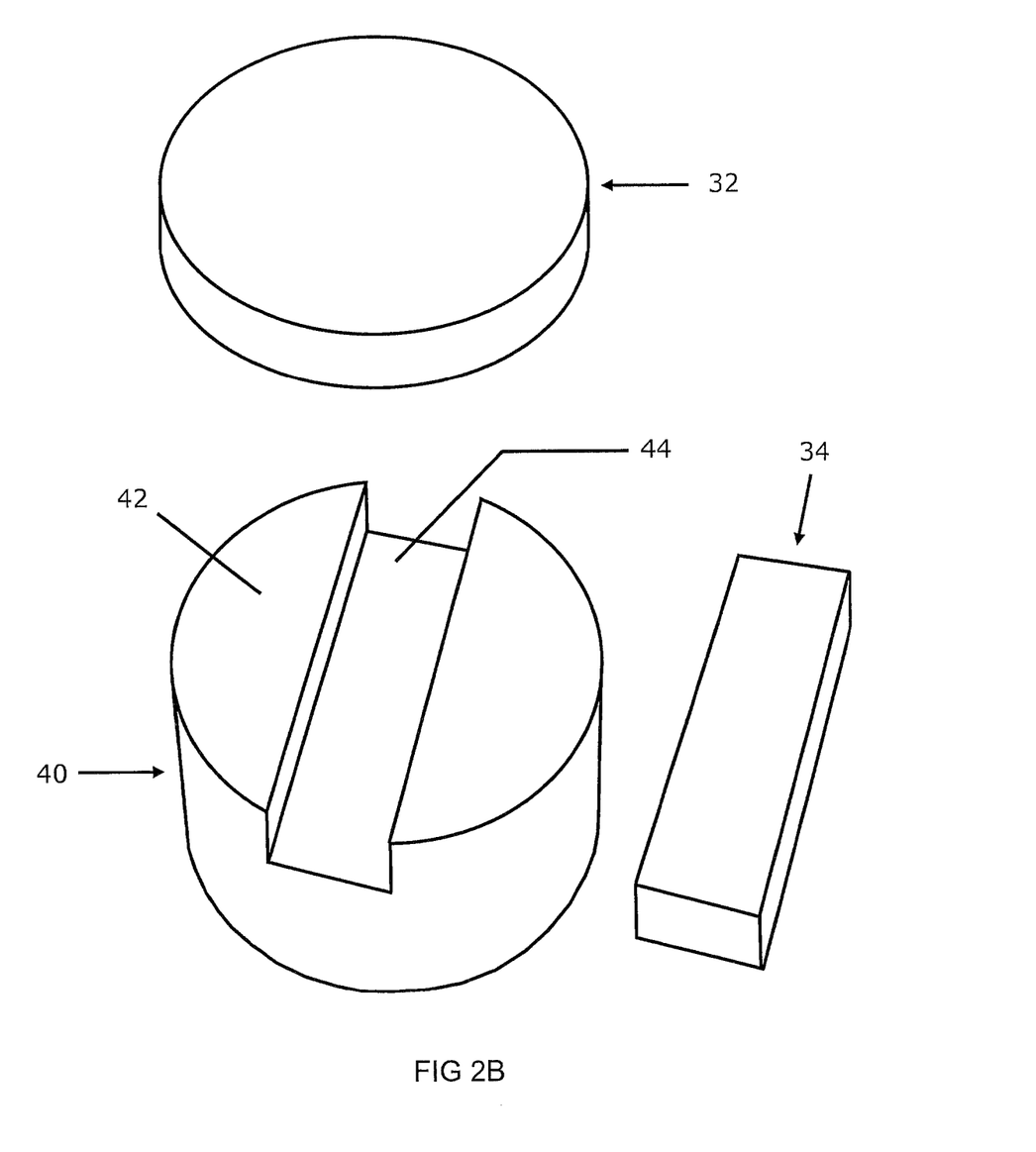
FIG. 2B shows a schematic perspective view of an assembly of components for an embodiment of an unjoined assembly for making the embodiment of the superhard construction shown in FIG. 2A.

With reference to FIG. 2B, a method for making an embodiment of superhard construction described with reference to FIG. 2A may include providing an aggregated mass of diamond grains in the form of pre-sintered first PCD structure 34, providing a cobalt-cemented tungsten carbide substrate 40 and forming a recess 44 into a proximate end 42 of the substrate 40. The recess 44 is configured to accommodate the first PCD structure 34, which may be formed by cutting it out of a PCD disc using electro-discharge machining (EDM), for example. The recess 44 may have a depth of about 2 mm to accommodate the first PCD structure 34 having a thickness of about 2 mm. A second PCD structure 32, which may be disc-like, may be placed against the exposed surface of the first PCD structure 34 and against the remaining exposed proximate end 42 of the substrate 40 to form an unjoined assembly. The substrate 40 may provide a source of cobalt for sintering the second PCD structure 32 to the first PCD structure 34 and bonding the first PCD structure 34 to the substrate 40. In embodiments in which a PCD structure 34, 32 contains cobalt, the PCD structure 34, 32 may provide a source of cobalt. The unjoined assembly is then assembled into a capsule for an ultra-high pressure furnace and subjected to a pressure of at least about 5.5 GPa and a temperature of at least about 1,250 degrees centigrade to sinter the second PCD structure 32 to the first PCD structure 34, and join the PCD structures 32, 34 to the substrate 40 to form the superhard construction.

Figure 3A:
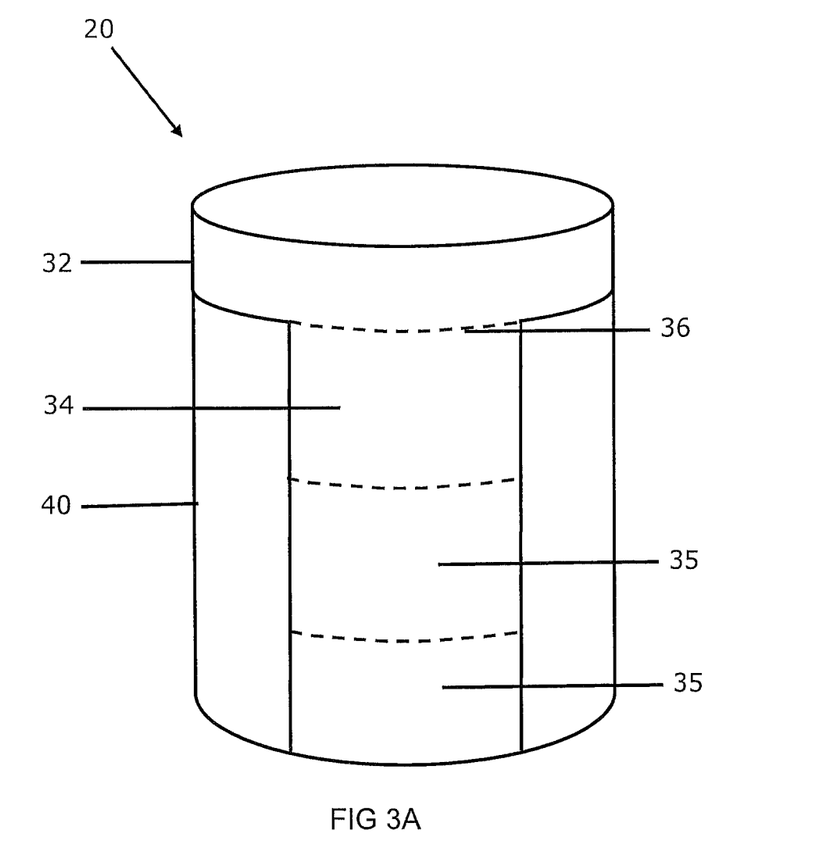
FIG. 3A shows schematic perspective view of an embodiment of a superhard construction, for a drill bit for boring into rock.

With reference to FIG. 3A, an embodiment of a superhard construction 20 comprises a first PCD structure 34 and additional PCD structures 35 located within a recess formed into the side of a generally cylindrical substrate 40, the recess extending from a proximate end to an opposite distal end of the substrate. The first and additional PCD structures 34, 35 may be sintered together to form an integrated, extended structure. The recess is configured to accommodate the first PCD structure 34 and the additional PCD structures 35. A further PCD structure 32 may be bonded to the substrate 40 at the proximate end 42 and sintered to a side of the PCD structure 34 at an interface 36, which is adjacent the proximate surface. The substrate 40 may be formed of cobalt-cemented tungsten carbide and the cobalt within the substrate 40 may function as a catalyst material for sintering diamond. The superhard construction 20 may be suitable for use as a cutter insert for a drill bit for boring into the earth.

Figure 3B:
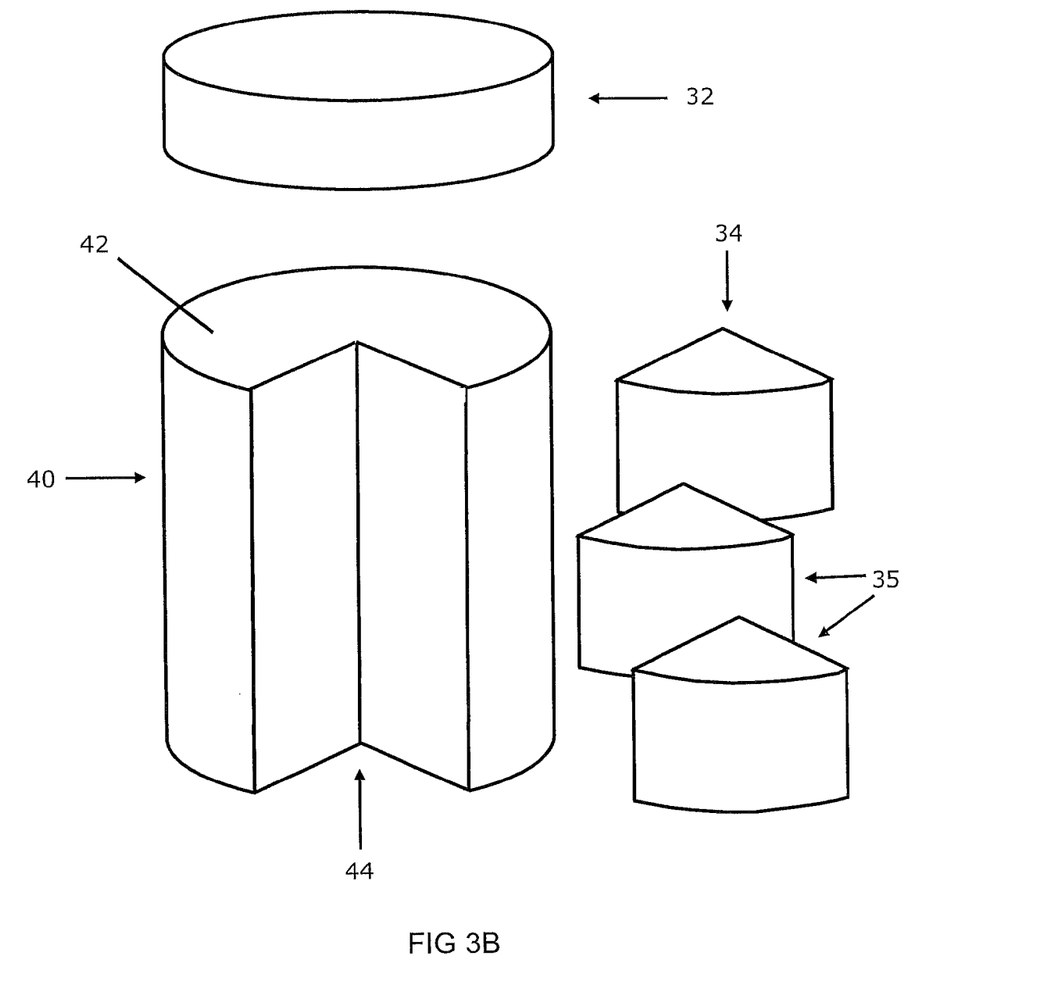
FIG. 3B shows a schematic perspective view of an assembly of components for an embodiment of an unjoined assembly for making the embodiment of the superhard construction shown in FIG. 3A.

With reference to FIG. 3B, a method for making an embodiment of superhard construction described with reference to FIG. 3A may include providing an aggregated mass of diamond grains in the form of pre-sintered first PCD structure 34, providing at least one additional PCD structure 35, providing a cobalt-cemented tungsten carbide substrate 40 that has a side connecting a proximate end 42 and a distal end, and forming a recess 44 into the side of the substrate 40, the recess extending from the proximate end. In one version, the recess may extend from the proximate end 42 to an opposite distal end of the substrate 40. The recess 44 is configured to accommodate the first PCD structure 34 as well as the additional PCD structures 35, which may be formed by cutting them out of one or more PCD discs using electro-discharge machining (EDM), for example. The recess 44 may extend from the side of the substrate 40 substantially to the central longitudinal axis of the substrate. The first PCD structure 34 may be placed adjacent the proximate end 42 of the substrate into the recess 44, and the additional PCD structures 35 may be placed into the recess stacked against each other, one of which may abut the first PCD structure. A further PCD structure 32, which may be in the general form of a disc, may be placed against the proximate end 42 of the substrate and against an exposed side of the first PCD structure 34 to form an unjoined assembly. The substrate 40 may provide a source of cobalt for sintering the second PCD structure 32 to the first PCD structure 34, sintering together the additional PCD structures 35, and bonding the PCD structures 32, 34, 35 to the substrate 40. In embodiments in which a PCD structure 32, 34, 35 contains cobalt, it may also provide a source of cobalt. The unjoined assembly is then assembled into a capsule for an ultra-high pressure furnace and subjected to a pressure of at least about 5.5 GPa and a temperature of at least about 1,250 degrees centigrade to sinter the second PCD structure 32 to the first PCD structures 34, and join the PCD structures 32, 34 to the substrate 40 to form the superhard construction.

Figure 4:
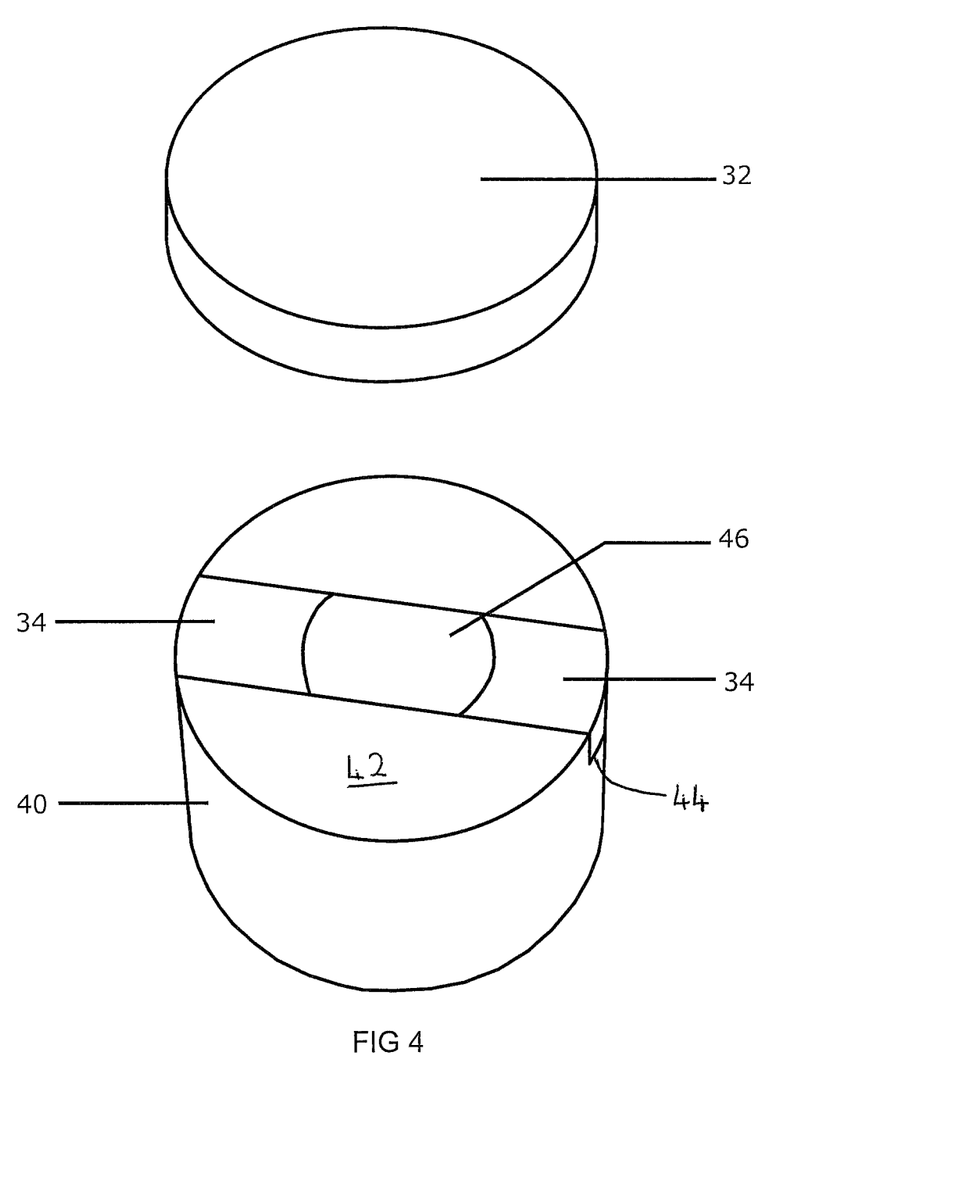
FIG. 4 shows a schematic perspective view of an assembly of components for an embodiment of an unjoined assembly for making the embodiment of a superhard construction.

With reference to FIG. 4, a method for making an embodiment of a superhard construction includes providing a pair of aggregated masses of diamond grains in the form of a pair of pre-sintered PCD structures 34, providing a cobalt-cemented tungsten carbide substrate 40 that has an end surface 42, and forming a recess 44 into the end surface 42, the recess 44 configured to accommodate both of the PCD structures 34, and to accommodate a spacer member 46 between the PCD structure 34. A further PCD structure 32, which may be in the general form of a disc, may be placed against the exposed surface of the pair of PCD structures 34 and against the remaining exposed end surface 42 of the substrate 40 to form an unjoined assembly 50. The substrate 40 or the spacer 46, or both, may provide a source of cobalt for sintering the further PCD structure 32 to the pair of PCD structures 34 and bonding the pair of PCD structures 34 to the substrate 40. The unjoined assembly is then assembled into a capsule for an ultra-high pressure furnace and subjected to a pressure of at least about 5.5 GPa and a temperature of at least about 1,250 degrees centigrade to sinter the further PCD structure 32 to the pair of PCD structures 34, and join the PCD structures 32, 34 to the substrate 40 to form the superhard construction.

Although the embodiments shown in FIG. 2A, FIG. 2B, FIG. 3A, FIG. 3B and FIG. 4 are depicted in these drawings as comprising PCD structures having sharp edges and corners, embodiments may comprise PCD structures having rounded, bevelled or chamfered edges or corners. Such embodiments may have the advantage of reduced internal stress and consequently extended working life.

Some embodiments of the method may comprise a construction comprising a PCS structure joined to a substrate and in which the PCD structure includes protrusions extending into recesses of the substrate may be manufactured without the disadvantage that the protrusions are less well sintered than the rest of the PCS structure. While wishing not to be bound by a particular theory, such constructions produced using known methods may have the disadvantage that superhard grains placed in a recess, groove or well within a substrate may not be well sintered because of uneven flow of catalyst material or uneven distribution of pressure during the sintering process, which may result in reduced strength or wear resistance, and consequently in reduced working life of tools comprising the superhard construction. Some embodiments may have the advantage that tools comprising superhard constructions of the type disclosed may have enhanced resistance to fracture and wear, and extended working life.

Embodiments are described in more detail with reference to the examples below, which are not intended to be limiting.

EXAMPLE 1

A PCD construction suitable for use as a cutter insert for a drill bit for drilling into the earth was made. The PCD construction comprised a PCD body bonded to a cemented carbide substrate, the PCD body comprising three PCD structures sintered together at an ultra-high pressure and high temperature.

A PCD disc having a diameter of about 16 mm and a thickness of about 2.2 mm was provided as known in the art. A pair of PCD structures was cut from the disc by means of electro-discharge machining (EDM), each of the PCD structures being generally rectangular and having a thickness of about 2.2 mm, a width of about 5 mm and a length of about 6 mm. Semi-circular sections were cut from an end of each of the PCD structures, providing a semi-circular recess formed at each respective end. A spacer member comprising cemented tungsten carbide was made, having a thickness of 2.2 mm, and configured with semi-circular ends for being accommodated against the semi-circular ends of the PCD structures.

A cemented carbide substrate having a generally cylindrical shape, with a diameter of about 16 mm and a height of about 1 cm was provided, and a generally rectangular recess, or slot, was formed into a proximate end of the substrate, the recess extending diametrically across the end of the substrate. The depth of the recess was about 2.2 mm and its width was about 5 mm. The PCD structures and the spacer member were placed into the slot recess of the substrate with the spacer member between the two PCD structures, semi-circular ends of the PCD structures facing inwards and abutting respective ends of the spacer member.

A further PCD disc having substantially the same composition as the first two PCD structures and having a diameter of about 16 mm and a thickness of about 2.2 mm was provided as known in the art. The further PCD disc was placed against the proximate end of the substrate and exposed surfaces of the first two PCD structures and the spacer member to form an unjoined assembly. The unjoined assembly was assembled into a capsule for an ultra-high pressure furnace and subjected to pressure of about 5.5 GPa and a temperature of about 1,350 degrees centigrade for about 5 minutes to sinter the components of the unjoined assembly into an integrally bonded compact.

EXAMPLE 2

A PCD construction suitable for use as a cutter insert for a drill bit for drilling into the earth may comprise a PCD body bonded to a cemented carbide substrate, the PCD body comprising two PCD structures sintered together at an ultra-high pressure and high temperature.

A PCD disc having a diameter of about 16 mm and a thickness of about 2 mm may be provided as known in the art. Five PCD structures each having the general shape of a wedge-like section of a cylinder may be cut from the disc by means of electro-discharge machining (EDM), each of the PCD structures having a thickness of about 2 mm.

A cemented carbide substrate having a generally cylindrical shape, with a diameter of about 16 mm and a height of about 1 cm may be provided, and a wedge-like recess may be formed longitudinally into the side of the substrate connecting a proximate end and a distal end of the substrate. The recess may extend from the side to the central longitudinal axis of the substrate. The five PCD structures may be placed into the wedge-like recess of the substrate, stacked on top of each other to fill the wedge-like recess in the substrate, forming a stacked structure extending from the proximate end to the distal end.

A further PCD disc having a diameter of about 16 mm and a thickness of about 2.2 mm may be provided as known in the art. The further PCD disc may be placed against the proximate end of the substrate and against an exposed side of the wedge-shaped PCD structure adjacent the proximate end to form an unjoined assembly. The unjoined assembly was assembled into a capsule for an ultra-high pressure furnace and subjected to pressure of about 5.5 GPa and a temperature of about 1,350 degrees centigrade for about 5 minutes to sinter the components of the unjoined assembly into an integrally bonded compact.

The invention claimed is:

1. A method of making a superhard construction, the method including:
    providing a polycrystalline superhard (PCS) structure comprising bonded grains of a superhard material;
    providing an aggregated mass comprising grains of the superhard material;
    providing a substrate having a recess configured for accommodating the PCS structure and at least one additional structure;
    placing the PCS structure into the recess and the additional structure into the recess;
    positioning the aggregated mass of superhard grains adjacent the PCS structure to form an unjoined assembly; and then
    applying pressure and heat to the unjoined assembly to join the aggregated mass to the PCS structure and form the superhard construction.

2. A method as claimed in claim 1, in which the additional structure comprises a PCS structure.

3. A method as claimed in claim 1, including placing the additional structure in the recess in contact with the PCS structure and applying pressure and heat to the unjoined assembly for a period to sinter the PCS structure and the additional structure to each other.

4. A method as claimed in claim 1, including applying pressure and heat to the unjoined assembly for a period for superhard grains in the PCS structure to bond directly to superhard grains of the aggregated mass.

5. A method as claimed in claim 1, in which the substrate, the PCS structure or the aggregated mass, or a combination of these includes catalyst material for the superhard grains.

6. A method as claimed in claim 1, the aggregated mass comprising bonded superhard grains.

7. A method as claimed in claim 1, the aggregated mass comprising substantially unbonded superhard grains.

8. A method as claimed in claim 1, the aggregated mass comprising a PCS structure.

9. A method as claimed in claim 1, the PCS structure comprising PCD material and the superhard grains comprise diamond grains.

10. A method as claimed in claim 1, the aggregated mass comprising PCD material.

11. A method as claimed in claim 1, the PCS structure or the aggregated mass, or both, being thermally stable PCD.

12. A method as claimed in claim 1, the substrate comprising cemented tungsten carbide material and contains catalyst material for diamond.

13. A method as claimed in claim 1, wherein:
    the step of providing the PCS structure further comprises providing a first polycrystalline diamond (PCD) structure;
    the step of providing the aggregated mass further comprises providing a second PCD structure;
    the step of providing the cemented carbide substrate further comprises providing a substrate having a recess configured for accommodating the second PCD structure;
    the method further comprising placing the second PCD structure into the recess with the first PCD structure positioned adjacent the second PCD structure to form the unjoined assembly; and
    wherein the step of applying pressure and heat comprises applying a pressure of at least 5.5 GPa and heat to generate a temperature of at least 1,250 degrees centigrade to the unjoined assembly to join the first PCD structure to the second PCD structure to produce the PCD construction.

14. A method as claimed in claim 13, the recess having a depth of at least about 1 mm.

15. A method as claimed in claim 1, in which the PCS construction is for a drill bit for boring into or degrading rock.

16. A method as claimed in claim 1, wherein the step of applying pressure and heat to the unjoined assembly includes joining the PCD structures to the substrate to form the superhard construction.

* * * * *